(12) United States Patent
Nguyen et al.

(10) Patent No.: US 11,333,807 B2
(45) Date of Patent: May 17, 2022

(54) METAL-OVERCOATED GRATING AND METHOD

(71) Applicant: Lawrence Livermore National Security, LLC, Livermore, CA (US)

(72) Inventors: Hoang T. Nguyen, Livermore, CA (US); Jerald A. Britten, Clayton, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 0 days.

(21) Appl. No.: 16/620,139

(22) PCT Filed: Jun. 1, 2018

(86) PCT No.: PCT/US2018/035723
§ 371 (c)(1),
(2) Date: Dec. 6, 2019

(87) PCT Pub. No.: WO2018/226539
PCT Pub. Date: Dec. 13, 2018

(65) Prior Publication Data
US 2020/0142107 A1 May 7, 2020

Related U.S. Application Data

(60) Provisional application No. 62/517,073, filed on Jun. 8, 2017.

(51) Int. Cl.
*G02B 5/18* (2006.01)

(52) U.S. Cl.
CPC ............. *G02B 5/18* (2013.01); *G02B 5/1857* (2013.01)

(58) Field of Classification Search
CPC ...... G02B 5/18; G02B 5/1857; G02B 5/1861; H01S 3/0057
See application file for complete search history.

(56) References Cited

U.S. PATENT DOCUMENTS

| 5,652,426 A | * | 7/1997 | Maeda | ..................... | G01D 5/38 250/237 G |
| 2001/0046055 A1 | * | 11/2001 | Speckbacher | ........ | G02B 5/1871 356/499 |
| 2005/0088744 A1 | | 4/2005 | Smith et al. | | |

(Continued)

FOREIGN PATENT DOCUMENTS

| JP | 2005091001 A | * | 4/2005 | ........... G02B 5/1861 |
| JP | 2009-049044 A | | 3/2009 | |

OTHER PUBLICATIONS

International Search Report and Written Opinion for PCT/US2018/035723 corresponding to U.S. Appl. No. 16/620,139, 13 pages.

*Primary Examiner* — Kimberly N. Kakalec
(74) *Attorney, Agent, or Firm* — Ladas & Parry, LLP

(57) ABSTRACT

Metallic overcoated diffraction gratings are particularly useful for high average power laser pulse compression. A dielectric oxide layer is attached to an etch-stop layer, where the dielectric oxide layer comprises a grating pattern including grating lines. Sidewalls of the grating lines taper together toward an upper surface of the dielectric oxide layer. A metallic overcoat is attached to the etch-stop layer and the dielectric oxide layer.

28 Claims, 5 Drawing Sheets

(56) References Cited

U.S. PATENT DOCUMENTS

| | | | |
|---|---|---|---|
| 2005/0117222 A1* | 6/2005 | Chiu | G02B 5/1852 |
| | | | 359/566 |
| 2005/0231806 A1 | 10/2005 | Barton et al. | |
| 2008/0316493 A1* | 12/2008 | Maeda | G01D 5/38 |
| | | | 356/445 |
| 2009/0246707 A1 | 10/2009 | Li et al. | |
| 2009/0268295 A1* | 10/2009 | Miller | G02B 1/11 |
| | | | 359/576 |
| 2010/0096359 A1* | 4/2010 | Shiu | G02B 5/1857 |
| | | | 216/24 |
| 2012/0300302 A1 | 11/2012 | Bonod et al. | |

\* cited by examiner

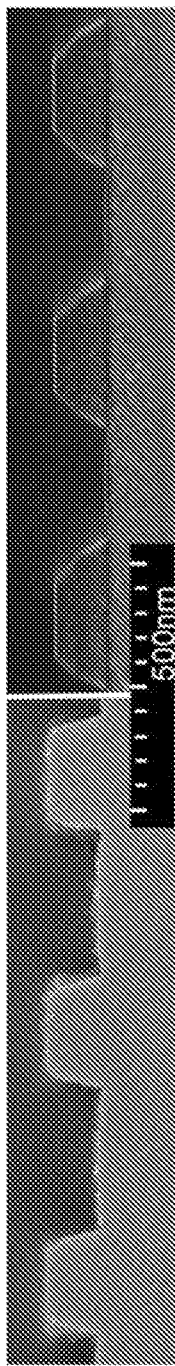
FIG. 4A
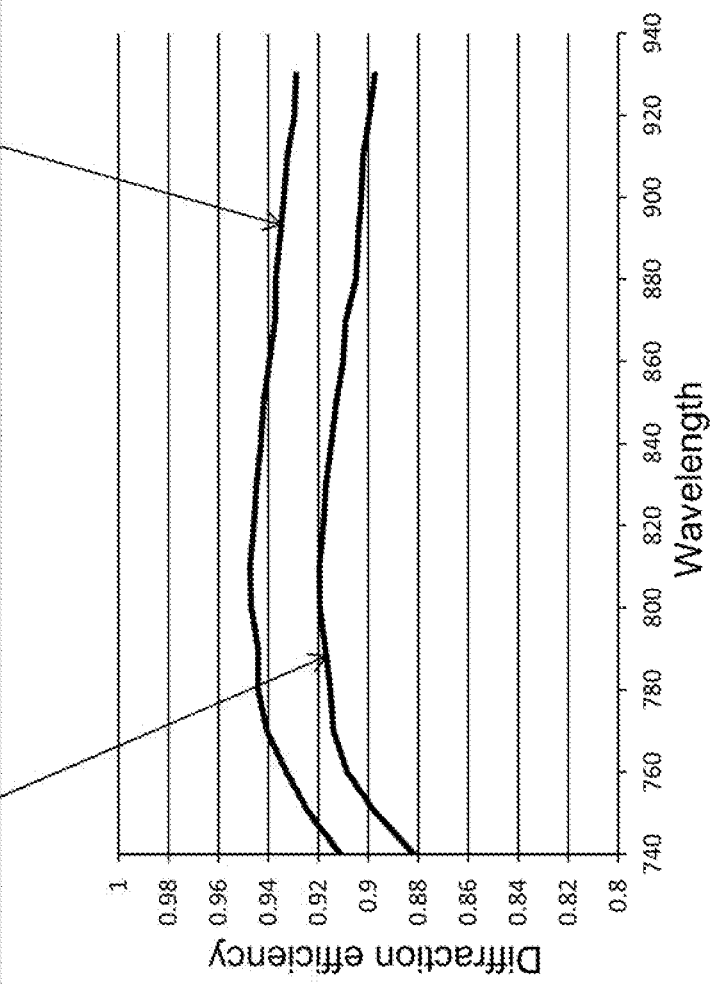
FIG 4B
FIG. 4C

METAL-OVERCOATED GRATING AND METHOD

CROSS-REFERENCE TO RELATED APPLICATIONS

This application claims the benefit of U.S. Provisional Patent Application No. 62/517,073 titled "Metal-Overcoated Dielectric Diffraction Grating for High Average Power Operations," filed Jun. 8, 2017, incorporated herein by reference.

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND OF THE TECHNOLOGY

Field of the Technology

The present technology relates to metal-overcoated gratings, and more particularly, this technology relates to metal-overcoated dielectric diffraction gratings for high average power operations.

Description of Related Art

Pulse compressors for ultrafast lasers have been identified as a technology gap in the push towards high-peak-power systems with high average power (>100 W) for industrial and scientific applications. Conventional gratings for ultra short-pulse (<150 fs) compressors are metallic and thus absorb a significant percentage of laser energy, resulting in up to 40% energy loss, thereby creating thermal issues that degrade on-target performance. The gratings are essential for achieving the highest laser irradiance and are used in the short-pulse compressor during chirped-pulse amplification (CPA). Existing petawatt CPA systems typically operate in the single-shot regime. However, there is growing interest and investment in new, high-intensity laser capabilities for industrial and discovery science applications that require high-repetition-rate, laser-driven, high-brilliance, secondary sources. The main challenge to operating at high average power is thermal management in the laser amplifiers that includes control and mitigation of thermally induced distortions in the diffractive pulse-compression gratings.

The grating compressor is one of the most critical components of a high-power CPA laser system. Requirements for the diffraction gratings include: high diffraction efficiency, high damage threshold, and often the ability to withstand high average powers.

Until recently, CPA laser systems have almost exclusively used diffraction gratings, in which a diffractive structure is typically coated with a thin gold film. These gold-coated pulse compression gratings have allowed the implementation of a number of high power laser systems around the world.

Currently, there are three configurations of gold-coated grating offered commercially: a) gold-coated photoresist gratings, b) gold-coated epoxy gratings, and c) gold-coated bulk glass gratings. A problem with gold-coated photoresist gratings and gold coated epoxy gratings is that they do not hold up well to high average power operations that can generate high temperatures on the gratings. High temperature operations can cause both photoresist and epoxy materials to decompose and out-gas thereby compromising the reliability and survivability of the gratings. A problem with gold-coated bulk glass gratings is that the typically vertical-sidewall results in lower diffraction efficiencies over a broad range of wavelengths, which is essential for achieving ultra short pulse operations.

It would be desirable to develop a gold-coated grating material that holds up to high average power operations and has diffraction efficiencies over a broad range of wavelengths.

SUMMARY

Various embodiments described herein characterize a new class of metal (e.g., gold) overcoated diffraction grating that has been developed and is particularly useful for high average power laser pulse compression. Some embodiments may have gold deposited on a refractory etched oxide (e.g., tantalum oxide) dielectric grating layer. Moreover, the grating layer may be positioned atop a metallic etch-stop layer that also may function as a release layer for wet chemical removal.

One embodiment of the present technology includes a method for producing metal-overcoated dielectric diffraction grating. An etch-stop layer is deposited above a substrate. A dielectric oxide layer is deposited onto the etch-stop layer, following by an absorbing layer onto the dielectric oxide layer and a photoresist layer onto the absorbing layer. The photoresist layer is etched to form a mask and then unmasked portions of the dielectric oxide layer are etched to form a grating pattern that includes grating lines, where sidewalls of the grating lines taper together toward an upper surface of the dielectric oxide layer, thereby forming tapered sidewalls. The absorbing layer and photoresist layer are removed. A conformal metallic overcoat is attached onto the etch-stop layer and the dielectric oxide layer.

One embodiment of the present technology includes a metal-overcoated dielectric diffraction grating in which an etch-stop layer is attached to a substrate. A dielectric oxide layer is attached to the etch-stop layer, where the dielectric oxide layer comprises a grating pattern including grating lines. Sidewalls of the grating lines taper together toward an upper surface of the dielectric oxide layer. A metallic overcoat is attached to the etch-stop layer and the dielectric oxide layer.

BRIEF DESCRIPTION OF THE DRAWINGS

The accompanying drawings, which are incorporated into and form a part of the disclosure, illustrate embodiments of the technology and, together with the description, serve to explain the principles of the invention.

FIG. 4A is a SEM image of a $SiO_2$ grating profile, according to one embodiment.

FIG. 4B is a SEM image of an $HfO_2$ grating profile, according to one embodiment.

FIG. 4C is a plot of diffraction efficiency versus wavelength of $SiO_2$ and $HfO_2$ grating profiles.

DETAILED DESCRIPTION

The following description is made for the purpose of illustrating the general principles of the present technology and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

A list of acronyms used in the description is provided below.

Figure 1A:
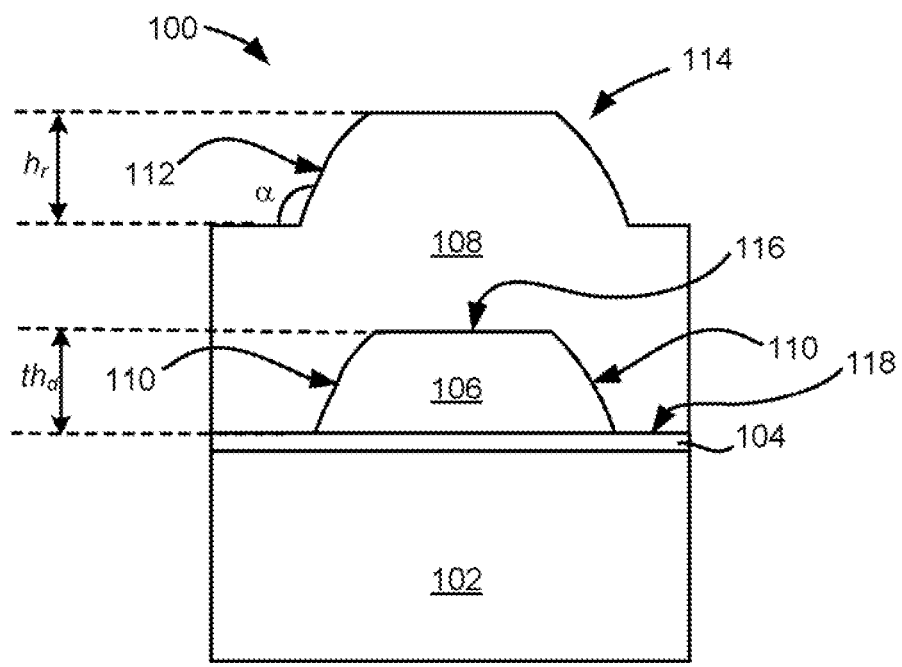
FIG. 1A is a schematic drawing of a product useable as a diffraction grating structure, according to one embodiment.

CPA Chirped pulse amplification
CVD Chemical vapor deposition
$HfO_2$ Hafnium dioxide
PCVD Plasma chemical vapor deposition
PVD Physical vapor deposition
SEM Scanning electron micrograph
$SiO_2$ Silicon dioxide
$Ta_2O_5$ Tantalum pentoxide
$ZrO_2$ Zirconium dioxide FIG. 1A depicts a product 100, in accordance with one embodiment. The product may be used as a diffraction grating structure. As an option, the present product 100 may be implemented in conjunction with features from any other embodiment listed herein, such as those described with reference to the other FIGS. Of course, however, such product 100 and others presented herein may be used in various applications and/or in permutations which may or may not be specifically described in the illustrative embodiments listed herein. Further, the product 100 presented herein may be used in any desired environment.

As shown in FIG. 1A, a diffraction grating may include a substrate 102. An etch-stop layer 104 may be formed above the substrate, e.g., on the substrate. In some approaches, an etch-stop layer 104 may include metallic material, for example but not limited to a chrome material. A dielectric oxide layer 106 may be formed above the etch-stop layer 104. The dielectric oxide layer 106 may include tapered sidewalls 110. The sidewalls 110 of the dielectric oxide layer 106 may taper together toward an upper surface 116 of the dielectric oxide layer 106. An overlying metallic overcoat 108 may conform to the shape of an upper surface 118 of the etch-stop layer 104 and the upper surface 116 of the dielectric oxide layer 106. The metallic overcoat 108 may include gold, silver, aluminum, etc. Various materials for the various layers are presented below in the discussion of the fabrication methods. Any of the materials listed there may be used in the product 100 in any combination.

Some embodiments described herein have several distinct advantages over the current state of the art of gratings. The absence of a photoresist layer in the product 100 thereby removes the low thermal stability inherent in structures with an integral photoresist layer. The dielectric oxide layer 106 may handle higher power loading without degradation, as typically seen in conventional diffraction gratings with a photoresist layer.

In some embodiments, e.g., as shown in FIG. 1A, the angle α and shape of the sidewall 112 of the grating ridges 114 may be engineered to provide better efficiency and/or bandwidth than grating structures from some studies in which the grating structures have been etched into a bulk glass substrate. In some approaches, the product 100 may provide a larger bandwidth in terms of a larger range of wavelengths.

In some embodiments, a spatial uniformity of the grating ridges may be improved since the grating ridge height $h_r$ may be defined only by the thickness $th_d$ of the dielectric oxide layer 106, which may be typically deposited in a very well controlled process. The underlying metallic layer acts as an etch-stop layer 104 by fixing the grating ridge height $h_r$ and simultaneously protecting the integrity of the polished optical surface of the substrate 102 underneath.

In some embodiments, the metallic etch-stop layer 104 may be soluble in wet chemical solution and, thus may be dissolved to lift the grating ridges 114 off the substrate 102. Therefore, the grating may be stripped. The substrate 102, released from the grating ridge 114, may be recycled a number of times during processing or after use without the need to re-polish the substrate, thereby enabling a large reduction in cycle time and cost.

In some embodiments, a metallic coating 108 (that, e.g., includes gold) may provide a larger efficacy bandwidth to support shorter pulses.

Figure 1B:
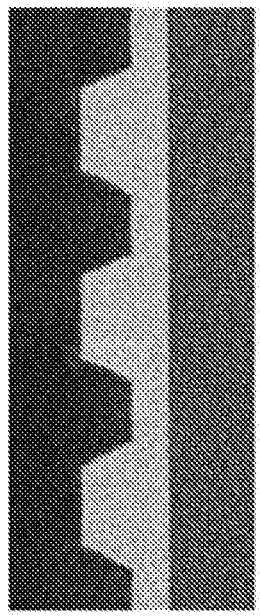
FIG. 1B is a scanning electron microscope (SEM) image of a $SiO_2$ grating profile, according to one embodiment.
Figure 1C:
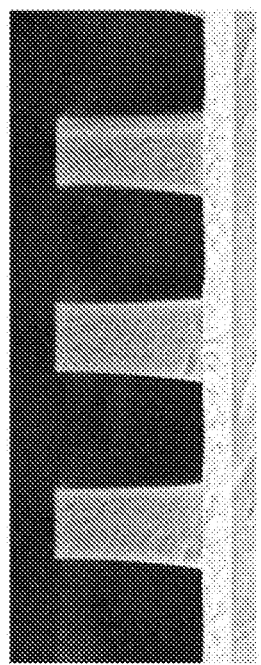
FIG. 1C is a SEM image of an $HfO_2$ grating profile, according to one embodiment.
Figure 1D:
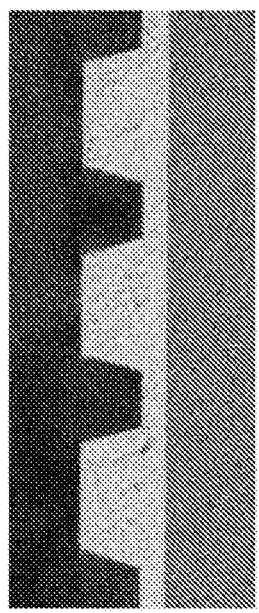
FIG. 1D is a SEM image of a $Ta_2O_5$ grating profile, according to one embodiment.

Various embodiments describe high-refractive index dielectric materials for diffraction gratings n~1.7. An etch profile of $SiO_2$ layers, as shown in FIG. 1B. An etch profile of high-index dielectric oxide layers, e.g. $HfO_2$ layers, is shown in FIG. 1C). An etch profile of another high-index $Ta_2O_5$ layer is shown in FIG. 1D. The etch profiles of FIGS. 1B, 1C and 1D were etched under the same conditions. The grating lines of $HfO_2$ layers (FIG. 1C) and $Ta_2O_5$ layers (FIG. 1D) have significantly more sidewall angle, believed to be due to re-deposition of this material etched from the trenches onto the sidewalls due to its very low volatility. In other approaches, a dielectric oxide layer 106 having a similarly-shaped sidewall taper (110 in FIG. 1A) may be generated by etching zirconium oxide ($ZrO_2$), etc.

In various embodiments, incorporation of an etch-stop layer under a dielectric oxide layer to be etched enables precise control of the thickness ($th_d$ in FIG. 1A) of the patterned dielectric oxide layer 106. The conformally deposited metallic overcoat then has a grating ridge 114 with a grating ridge height ($h_r$ in FIG. 1A) that is substantially equal to the thickness ($th_d$ in FIG. 1A) of the deposited dielectric oxide layer.

Moreover, an etch-stop layer made with a material soluble in a wet-chemical solution may also allow for the entire structure to be lifted off by wet chemical etching to preserve the substrate optical surface if the grating fails to meet specification.

FIGS. 2A through 2F show a method 200 for forming a grating with a dielectric layer, in accordance with one embodiment. As an option, the present method 200 may be implemented to form structures such as those shown in the other FIGS., such as FIGS. 1A, 1C, 3A and 4B described herein. Of course, however, this method 200 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 2 may be included in method 200, according to various embodiments. It should also be noted that any of the aforementioned features may be used in any of the embodiments described in accordance with the various methods.

Figure 2A:
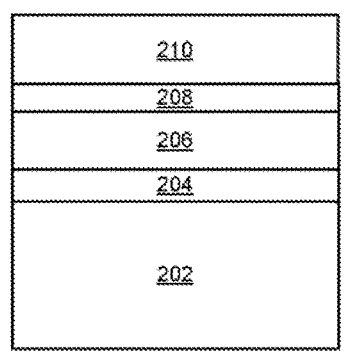
FIGS. 2A-2F are schematic drawings of a process, according to one embodiment.

The process flow of a method 200 for formation of a grating is shown in FIGS. 2A-2F. In FIG. 2A, a substrate 202 may be coated with an etch-stop layer 204. In some approaches, the substrate 202 may be polished before depositing an etch-stop layer 204. In some approaches, the substrate 202 may be obtained commercially.

The etch-stop layer 204 may be etch-resistant in the reactive ion beam etcher, but soluble in wet chemical solution for liftoff from the substrate 202. The etch-stop layer 204 may be formed conventionally of conventional materials, according to various embodiments. In some embodiments, the etch-stop layer may be a non-oxide layer. In some approaches, the etch-stop layer is a metal layer. In some approaches, the etch-stop layer may include nitride material, for example, but not limited to boron nitride. In some approaches, the etch-stop layer 204 may include chrome as an etch-stop material.

The etch-stop layer may be deposited onto the substrate by deposition methods well known in the art, for example, but not limited to, vacuum deposition, spray deposition, chemical vapor deposition (CVD), physical vapor deposition (PVD), plasma chemical vapor deposition (PCVD), electroplating (e.g. chrome-plating), electropolishing, etc.

A dielectric oxide layer 206 may be deposited to a predetermined thickness onto the etch-stop layer 204. The thickness of the dielectric oxide layer 206 may be optimized to give high diffraction efficiency when etched into a grating profile. The dielectric oxide layer 206 may include $Ta_2O_5$, $ZrO_2$, $HfO_2$, $SnO_2$, $InO_2$, $ZnO$, etc. In an exemplary embodiment, a dielectric oxide layer 206 of an amorphous dielectric oxide, e.g. $Ta_2O_5$, may generate a desired sidewall taper shape when etched.

In some approaches, a dielectric oxide layer 206 may be deposited on the etch-stop layer by sputtering using targets of dielectric oxide, for example, $Ta_2O_5$ targets.

In other approaches, a dielectric oxide layer 206 may be formed on the etch-stop layer by evaporation or sputtering of a metal in an oxygen-rich atmosphere. For example, a metal target (e.g., a Ta target) is used for sputtering in an environment backfilled with oxygen. Forming the dielectric oxide layer by oxidizing metal in the atmosphere during deposition tends to provide a higher resistance to laser damage in the final product, according to one embodiment.

In some approaches, the materials for the dielectric oxide layer 206 may be deposited onto the etch-stop layer 204 in a vacuum chamber using, for example, electron beam evaporation.

An absorbing polymer layer 208 and a photoresist layer 210 may be sequentially deposited onto the dielectric oxide layer 206, typically by spin, meniscus and/or dip coating. The absorbing polymer layer 208 may absorb UV light that may be used to pattern the photoresist 210, thereby preventing back reflections from the underlying interfaces of the etch-stop layer 204 and the substrate 202 which could otherwise modulate the exposed photoresist pattern.

Figure 2B:
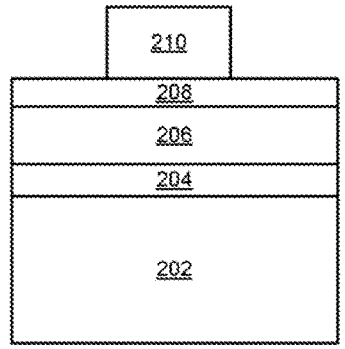

Looking to FIG. 2B, the method includes patterning the photoresist layer to form a mask. In some approaches, photoresist layer 210 may be exposed and developed to generate the grating lines in the photoresist layer 210. In some approaches, the photoresist layer 210 may be baked and/or cured before the etching process.

Figure 2C:
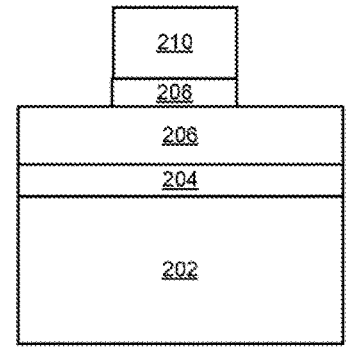

As shown in FIG. 2C, a polymer transfer etch may be performed to transfer the pattern of the photoresist layer 210 into the absorbing polymer layer 208.

Figure 2D:
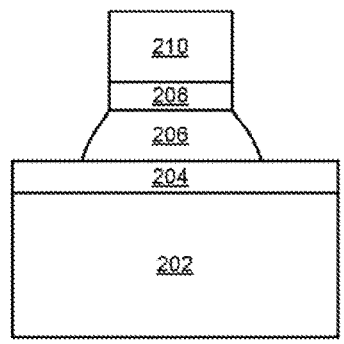

As shown in FIG. 2D, the method includes etching unmasked portions of the dielectric oxide layer thereby forming tapered sidewalls of the dielectric oxide layer. In some approaches, an oxide etch may be performed by reactive ion beam etching, for example, to transfer the pattern of the photoresist layer 210 into the dielectric oxide layer 206.

In some approaches, the etching process may include capacitor-coupled etching, reactive ion etching, reactive ion beam etching, and/or vacuum-based plasma processing. In preferred approaches, the etching process is a chemical reactive ion etching. For example, in an exemplary approach, etching by reactive ion beam employing methods well known in the art using fluorine-based (SF6, CF4, CHF3) chemistry may be used for etching the dielectric oxide layer, thereby forming the tapered edge. In some approaches, the radical fluorine beam accelerates toward the dielectric oxide layer. An ion beam (e.g. fluorine) has some directionality that allows more defined etching of the portions without photoresist (unmasked portions) and further allows addition of divergence to the beam (e.g., to provide some angle to the etching process), and thereby the sidewall may be tapered by the ion beam. In an exemplary approach, dielectric oxides (e.g., $Ta_2O_5$) may be naturally sensitive to the etching by the ion beam as a function of impinging angle. In contrast, the bulk $SiO_2$ of conventional structures may not have comparable sensitivity to an impinging angle of ion beam etching and thereby results in vertical sidewalls.

In some embodiments, the etch-stop layer 204 allows control of the ridge height ($h_r$, see FIG. 1A) by stopping the etch process at the desired thickness ($th_d$, see FIG. 1A) of the dielectric oxide layer. In some embodiments, the ridge height ($h_r$) may be in the range of about 180 nm to about 230 nm but may be higher or lower as needed to obtain efficiency of an optimal bandwidth.

Figure 2E:
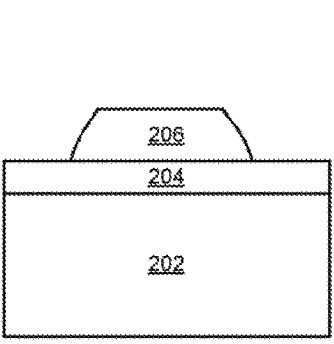

Looking to FIG. 2E, the photoresist layer 210 and absorbing polymer film layer 208 may be stripped, e.g., by wet chemical means, thereby exposing the surface of the dielectric oxide layer 206.

In some embodiments, an adhesion layer (not shown) may be deposited on the dielectric oxide layer on the etch-stop layer prior to the deposition of a metal overcoat. In some approaches, the adhesion layer may be chrome.

In some embodiments, additional layers may be added to the layers shown in FIGS. 2A-2F. One skilled in the art upon reading the embodiments herein would be able to include additional layers.

Figure 2F:
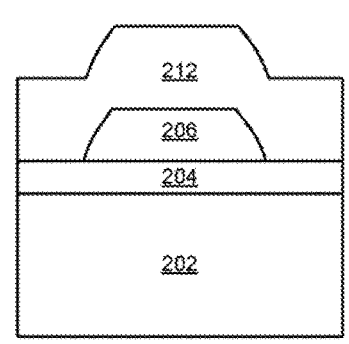

In FIG. 2F, the method includes depositing a conformal metallic overcoat above the remaining etch-stop layer and dielectric oxide layer. In one embodiment, the dielectric oxide layer 206 on the etch-stop layer 204 may be overcoated with a metal 212 (e.g., gold, silver, aluminum, etc.) to make the final grating structure product. The overcoat may be added by a conformal deposition process, for example, but not limited to, CVD, PVD, magnetron sputtering, ion beam sputtering, electron beam evaporation, etc. In a preferred approach, a gold overcoat may be deposited by electron beam evaporation.

In various embodiments, desirable high performance of diffraction may occur with gratings in which the side walls are perpendicular to the incoming light. In some applications, light may approach the diffraction gratings at an angle; thus, straight sidewalls would diminish high performance. In ideal systems, the highest efficiency may occur with sidewalls that generally follow a sinusoidal-type curve. In various embodiments described herein, the natural taper of the sidewalls of the diffractive refractory oxide layer may provide near-optimal diffraction efficiency, e.g., by generally approximating a sinusoidal-type curve shape.

Recent studies show the dielectric material, hafnium oxide ($HfO_2$), may not be an ideal dielectric material for use as a film layer. Hafnium oxide has crystalline properties that exhibit columnar growth structures that are non-amorphous. Moreover, chemical contaminants have been shown to leak in and become trapped in the small openings in the non-amorphous hafnium oxide film layer thereby contaminating the surface. The density of the trapped contaminants is so high that the metallic overcoat can appear foggy, hazy, stained, blotchy, etc. to the naked eye and degrade the performance of the diffraction grating.

According to some embodiments, the dielectric oxide material is amorphous. An amorphous dielectric oxide does not have micro-cracks or micro-crevices like the aforementioned layers having crystalline properties, and therefore are more resistant to contamination and leaking.

In one embodiment, the amorphous dielectric oxide may be tantalum oxide ($Ta_2O_5$). $Ta_2O_5$ is a high temperature oxide and very stable. In some embodiments, $Ta_2O_5$ may be etched to form a tapered side wall to provide high refractive efficiency (see FIG. 1D).

In an exemplary embodiment, tantalum oxide may produce a taper etched grating profile which is critical in obtaining the highest achievable grating diffraction efficiency.

Moreover, as dielectric oxides, tantalum oxide and hafnium oxide may be interchangeable materials.

Experiments

Figure 3A:
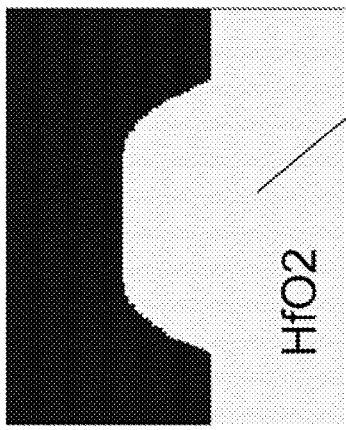
FIG. 3A is a schematic modeling drawing of a Au-overcoated $HfO_2$ grating profile, according to one embodiment.
Figure 3B:
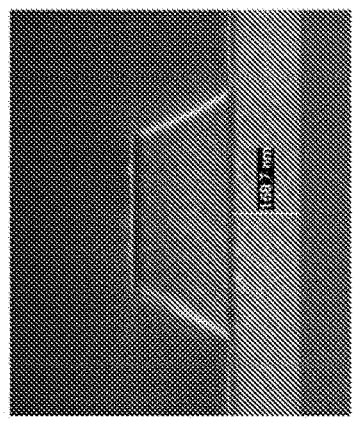
FIG. 3B is a SEM image of an $HfO_2$ grating profile, according to one embodiment.
Figure 3C:
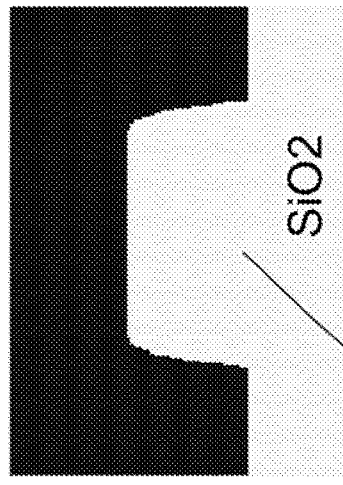
FIG. 3C is a schematic modeling drawing of a typical vertical-sidewall $SiO_2$ grating profile with Au overcoat, according to one embodiment.
Figure 3D:
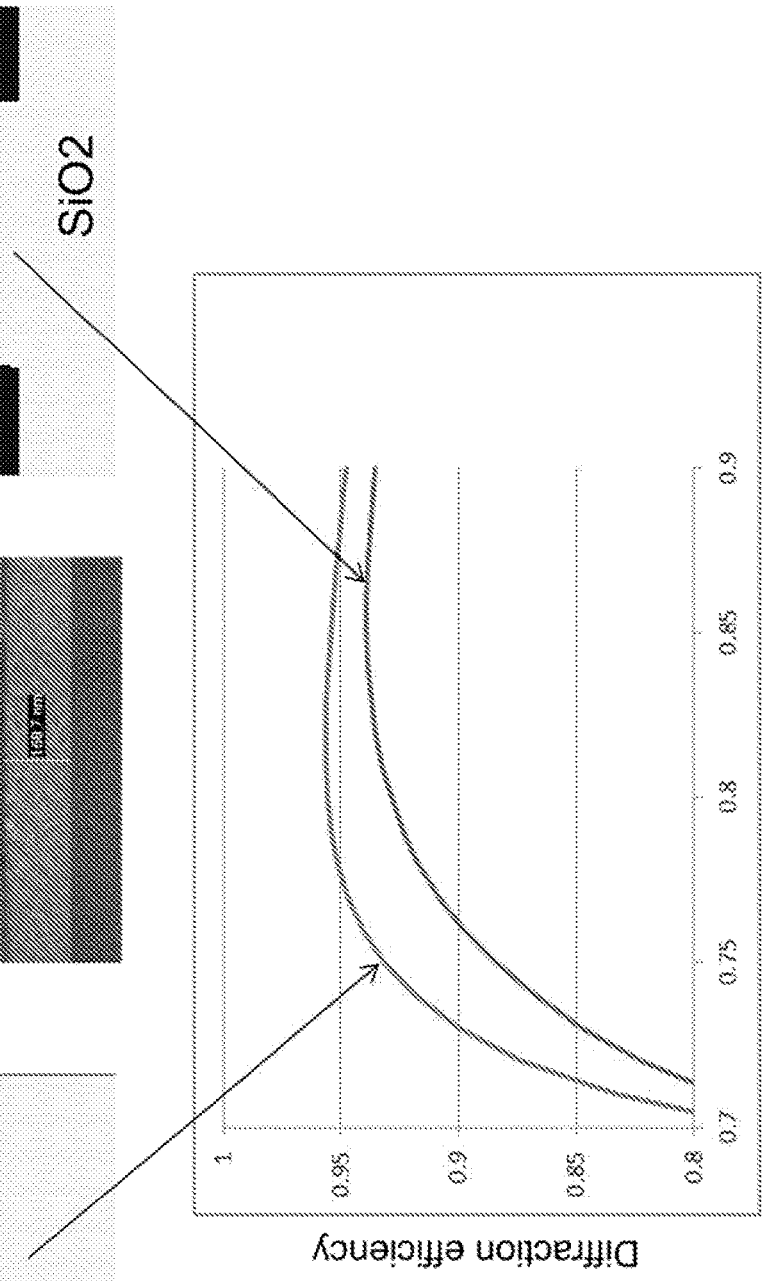
FIG. 3D is a plot of diffraction efficiency versus wavelength of $SiO_2$ and $HfO_2$ grating profiles.

FIGS. 3A-3D show the differences in tapered sidewalls of the dielectric oxide profile compared to vertical sidewalls of a $SiO_2$ grating profile. FIGS. 3A and 3C represent modeled profiles of an Au-overcoated $HfO_2$ grating (FIG. 3A) and a conventional Au-overcoated $SiO_2$ grating (FIG. 3C). FIG. 3B is a scanning electron micrograph (SEM) image of an actual etched profile of an $HfO_2$ grating profile. FIG. 3D is a plot of the optimized designs modeled with Au-overcoated $HfO_2$ grating with tapered sidewalls and Au-overcoated $SiO_2$ grating with vertical side walls with a typical gold overcoated grating design (1480 1/mm) and use conditions (55 degrees and TM polarization) to demonstrate diffraction efficiency (y-axis) versus wavelength (x-axis).

FIG. 3D shows how shape changes as a function of wavelength range. As shown, the solid line represents $SiO_2$ as bulk grating material where the substrate is $SiO_2$ and the grating is carved into the substrate thereby producing sidewalls that are much straighter (FIG. 3C) than as shown in the $HfO_2$ grating profile (FIGS. 3A, 3B). FIG. 3D is a theoretical plot showing that $HfO_2$ does not roll off as sharply as $SiO_2$, the $HfO_2$ remains above 95% longer than $SiO_2$, and so $HfO_2$ grating may provide a higher performance over a broader range of wavelengths.

A comparison of typical grating profiles for etched-glass is shown in FIG. 4A and etched $HfO_2$ gratings in FIG. 4B. FIG. 4C shows the diffraction efficiency (y-axis) versus wavelength (x-axis) of each such gratings optimized for 800 nm, 56 degrees. For a four-pass pulse compressor setup, the total throughput efficiency of the $HfO_2$ overcoated grating, averaged over the wavelength range 740-930 nm, is approximately 6'1, better than the overcoated etched-glass grating. Reactive ion-beam etching of dielectric oxides with tapered sidewalls as shown in FIG. 4B may create diffraction gratings with higher efficiency and bandwidth than the current state of the art diffraction gratings, represented by overcoated etched-glass gratings in FIG. 4A. By employing an etch-stop layer, the spatial uniformity of the grating at large aperture may be reproducible, because the film thickness may be fixed by the thickness of a well-controlled deposition of the dielectric oxide layer onto the etch-stop layer. Moreover, the etch-stop layer may enable recycling of the substrate without need to re-polish the substrate, thereby resulting in potentially significant cost and time savings.

In Use

Various embodiments described herein may be used in short pulse laser pulse stretching and compression. Some embodiments may be used in spectroscopic instruments.

Concepts:

This writing presents at least the following concepts.

1. A method, comprising:
    providing a substrate;
    depositing an etch-stop layer above said substrate;
    depositing a dielectric oxide layer onto said etch-stop layer;
    depositing an absorbing layer onto said dielectric oxide layer;
    depositing a photoresist layer onto said absorbing layer;
    patterning said photoresist layer to form a mask;
    etching unmasked portions of said dielectric oxide layer to form a grating pattern including grating lines, wherein sidewalls of said grating lines taper together toward an upper surface of said dielectric oxide layer, thereby forming tapered sidewalls;
    removing said absorbing layer and said photoresist layer; and
    depositing a conformal metallic overcoat onto said etch-stop layer and said dielectric oxide layer.

2. The method of concepts 1, and 3-34, wherein said substrate is polished prior to the step of depositing an etch-stop layer.

3. The method of concepts 1, 2 and 4-34, wherein said etch-stop layer is etch-resistant in a reactive ion beam etcher, but soluble in wet chemical solution for liftoff from said substrate.

4. The method of concepts 1-3 and 5-34 wherein said etch-stop layer comprises a non-oxide material.

5. The method of concepts 1-4 and 6-34, wherein said etch-stop layer comprises metal.

6. The method of concepts 1-5 and 7-34, wherein said etch-stop layer comprises nitride material.

7. The method of concept 6, wherein said nitride material comprises boron nitride.

8. The method of concepts 1-5 and 9-34, wherein said etch-stop layer comprise chrome.

9. The method of concepts 1-8, 10-12 and 15-34, wherein said etch-stop layer is deposited onto said substrate by a deposition selected from the group consisting of vacuum deposition, spray deposition, chemical vapor deposition (CVD), physical vapor deposition (PVD), plasma chemical vapor deposition (PCVD), electroplating and electropolishing.

10. The method of concepts 1-9 and 11-34, wherein said dielectric oxide layer is deposited onto said etch-stop layer to a predetermined thickness that has been optimized to operate at a desired diffraction efficiency when etched into a grating profile.

11. The method of concepts 1-10 and 13-34, wherein said dielectric oxide layer comprises material selected from the group consisting of $Ta_2O_5$, $ZrO_2$, $HfO_2$, $SnO_2$, $InO_2$, $ZnO$, $Al_2O_3$ (aluminum oxide) $Y_2O_3$ (yttrium oxide) and $Sc_2O_3$ (scandium oxide).

12. The method of concepts 1-11 and 13-34, wherein said dielectric oxide layer comprises an amorphous dielectric oxide.

13. The method of concepts 1-12, 14-34, wherein said dielectric oxide is deposited onto said etch-stop layer by sputtering using targets of dielectric oxide.

14. The method of concepts 1-9, 10-13 and 15-34, wherein said dielectric oxide layer is deposited onto said etch-stop layer by evaporation or sputtering of a metal in an oxygen-rich atmosphere.

15. The method of concepts 1-14 and 16-34, wherein said dielectric oxide layer is deposited onto said etch-stop layer in a vacuum chamber.

16. The method of concepts 1-15 and 17-34, wherein said absorbing layer comprises a polymer.

17. The method of concept 1-16 and 18-34, wherein said absorbing layer is deposited onto said dielectric oxide layer by spin, meniscus and/or dip coating.

18. The method of concepts 1-17 and 19-34, wherein said photoresist layer is deposited onto said absorbing layer by spin, meniscus and/or dip coating.

19. The method of concepts 1-18 and 20-34, wherein the step of patterning the photoresist layer to form a mask includes exposing and developing said photoresist layer to generate grating lines.

20. The method of concepts 1-19 and 21-34, further comprising baking and/or curing said photoresist layer before the step of etching unmasked portions of said dielectric oxide layer.

21. The method of concepts 1-20 and 22-34, wherein the step of depositing a photoresist layer onto said absorbing layer utilizes a polymer transfer etch to transfer the pattern of said photoresist layer said absorbing layer.

22. The method of concepts 1-21 and 27-34, wherein the step of etching unmasked portions of said dielectric oxide layer comprises reactive ion etching of said unmasked portions to transfer the pattern of said photoresist layer into said dielectric oxide layer.

23. The method of concepts 1-22 and 27-34, wherein the step of etching unmasked portions of said dielectric oxide layer comprises an etching process selected from the group consisting of capacitor-coupled etching, reactive ion etching, reactive ion beam etching and vacuum-based plasma processing.

24. The method of concepts 22 and 23, wherein said reactive ion etching comprises chemical reactive ion etching.

25. The method of concept 24, wherein said chemical reactive etching uses fluorine-based chemistry for etching said dielectric oxide layer, thereby forming the tapered edge.

26. The method of concept 25, wherein said fluorine-based chemistry accelerates a radical fluorine beam toward said dielectric oxide layer.

27. The method of concepts 1-26 and 28-34, wherein said etch-stop layer allows control of height of said tapered sidewalls by stopping the etch process at a desired thickness of said dielectric oxide layer.

28. The method of concept 27, wherein said height is optimized to obtain efficiency of a desired bandwidth.

29. The method of concepts 1-28 and 30-34, wherein the step of removing said absorbing layer and said photoresist layer is carried out by wet chemical means to expose the surface of said dielectric oxide layer.

30. The method of concepts 1-29 and 31-34, further comprising depositing an adhesion layer onto said dielectric oxide layer prior to the step of depositing a conformal metallic overcoat.

31. The method of concept 30, wherein said adhesion layer comprises chrome.

32. The method of concepts 1-31, 33 and 34, wherein said conformal metallic overcoat is a pillar of a grating.

33. The method of concepts 1-32 and 34, wherein said metallic overcoat comprises metal selected from the group consisting of gold, silver and aluminum.

34. The method of concepts 1-33, wherein the step of depositing a conformal metallic overcoat comprises a conformal deposition process selected from the group consisting of CVD, PVD, magnetron sputtering, ion beam sputtering and electron beam evaporation.

35. An apparatus, comprising:
a substrate;
an etch-stop layer fixedly attached to said substrate;
a dielectric oxide layer fixedly attached to said etch-stop layer, wherein said dielectric oxide layer comprises a grating pattern including grating lines, wherein sidewalls of said grating lines taper together toward an upper surface of said dielectric oxide layer; and
a metallic overcoat fixedly attached to said etch-stop layer and said dielectric oxide layer.

36. The apparatus of concepts 35 and 37-50, wherein said substrate has been polished.

37. The apparatus of concepts 35, 36 and 38-50, wherein said etch-stop layer is etch-resistant in a reactive ion beam etcher, but soluble in wet chemical solution for liftoff from said substrate.

38. The apparatus of concepts 35-37 and 39-50, wherein said etch-stop layer comprises a non-oxide material.

39. The apparatus of concepts 35-38 and 40-50, wherein said etch-stop layer comprises metal.

40. The apparatus of concepts 35-39 and 42-50, wherein said etch-stop layer comprises nitride material.

41. The apparatus of concept 40, wherein said nitride material comprises boron nitride.

42. The apparatus of concepts 35-39 and 43-50, wherein said etch-stop layer comprise chrome.

43. The apparatus of concepts 35-42 and 44-50, wherein said dielectric oxide layer comprises a predetermined thickness that has been optimized to operate at a desired diffraction efficiency when etched into a grating profile.

44. The apparatus of concepts 35-43 and 45-50, wherein said dielectric oxide layer comprises material selected from the group consisting of $Ta_2O_5$, $ZrO_2$, $HfO_2$, $SnO_2$, $InO_2$, $ZnO$, $Al_2O_3$ (aluminum oxide) $Y_2O_3$ (yttrium oxide) and $Sc_2O_3$ (scandium oxide).

45. The apparatus of concepts 35-44 and 46-50, wherein said dielectric oxide layer comprises an amorphous dielectric oxide.

46. The apparatus of concepts 35-45 and 47-50, wherein the height and sidewall angle of said tapered sidewalls are optimized to obtain efficiency of a desired bandwidth.

47. The apparatus of concepts 35-46, 49 and 50, further comprising an adhesion layer between and in direct contact with said dielectric oxide layer and said metallic overcoat.

48. The apparatus of concept 47, wherein said adhesion layer comprises chrome.

49. The apparatus of concepts 35-48 and 50, wherein said metallic overcoat comprises metal selected from the group consisting of gold, silver and aluminum.

50. The apparatus of concepts 35-49, wherein said sidewalls comprise a height that is defined by the thickness of said dielectric oxide layer and the properties of said etch-stop layer.

The foregoing description of the technology has been presented for purposes of illustration and description and is not intended to be exhaustive or to limit the technology to the precise form disclosed. Many modifications and variations are possible in light of the above teaching. The embodiments disclosed were meant only to explain the principles of the technology and its practical application to thereby enable others skilled in the art to best use the technology in various embodiments and with various modifications suited to the particular use contemplated. The scope of the technology is to be defined by the following claims.

All elements, parts and steps described herein are preferably included. It is to be understood that any of these elements, parts and steps may be replaced by other elements, parts and steps or deleted altogether as will be obvious to those skilled in the art.

Broadly, this writing discloses at least the following. Metallic overcoated diffraction gratings appear to be particularly useful for high average-power laser pulse compression. A dielectric oxide layer is attached to an etch-stop layer, where the dielectric oxide layer comprises a grating pattern including grating lines. Sidewalls of the grating lines taper together toward an upper surface of the dielectric oxide layer. A metallic overcoat is attached to the etch-stop layer and the dielectric oxide layer.

We claim:

1. An apparatus, comprising: a substrate; an etch-stop layer fixedly attached to said substrate; a dielectric oxide layer fixedly attached to said etch-stop layer, wherein said dielectric oxide layer comprises a grating pattern including grating lines, wherein sidewalls of said grating lines taper together toward an upper surface of said dielectric oxide layer, and wherein said tapered sidewalls have a non-zero curvature; and a metallic overcoat fixedly attached to said etch-stop layer and said dielectric oxide layer, wherein the metallic overcoat fills spaces between adjacent grating lines and forms grating ridges above the grating lines.

2. The apparatus of claim 1, wherein said substrate is polished.

3. The apparatus of claim 2, wherein said etch-stop layer is etch-resistant in a reactive ion beam etcher, but soluble in wet chemical solution for liftoff from said substrate.

4. The apparatus of claim 1, wherein said etch-stop layer comprises a non-oxide material.

5. The apparatus of claim 1, wherein said etch-stop layer comprises metal.

6. The apparatus of claim 1, wherein said etch-stop layer comprises nitride material.

7. The apparatus of claim 6, wherein said nitride material comprises boron nitride.

8. The apparatus of claim 1, wherein said etch-stop layer comprises chrome.

9. The apparatus of claim 1, wherein said dielectric oxide layer comprises a predetermined thickness that has been optimized to operate at a desired diffraction efficiency when etched into a grating profile.

10. The apparatus of claim 1, wherein said dielectric oxide layer comprises material selected from the group consisting of $Ta_2O_5$, $ZrO_2$, $HfO_2$, $SnO_2$, $InO_2$, $ZnO$, $Al_2O_3$ (aluminum oxide) $Y_2O_3$ (yttrium oxide) and $Sc_2O_3$ (scandium oxide).

11. The apparatus of claim 1, wherein said dielectric oxide layer comprises an amorphous dielectric oxide.

12. The apparatus of claim 1, wherein the height and sidewall angle of said tapered sidewalls are optimized to obtain efficiency of a desired bandwidth.

13. The apparatus of claim 1, further comprising an adhesion layer between and in direct contact with said dielectric oxide layer and said metallic overcoat.

14. The apparatus of claim 1, wherein said adhesion layer comprises chrome.

15. The apparatus of claim 1, wherein said metallic overcoat comprises metal selected from the group consisting of gold, silver and aluminum.

16. The apparatus of claim 1, wherein said sidewalls comprise a height that is defined by the thickness of said dielectric oxide layer and the properties of said etch-stop layer.

17. A method for preparing the apparatus according to claim 1, comprising:
providing the substrate;
depositing the etch-stop layer above said substrate;
depositing the dielectric oxide layer onto said etch-stop layer;
depositing an absorbing layer onto said dielectric oxide layer;
depositing a photoresist layer onto said absorbing layer; patterning said photoresist layer to form a mask;
etching unmasked portions of said dielectric oxide layer to form the grating pattern including the grating lines, wherein the sidewalls of said grating lines taper together toward an upper surface of said dielectric oxide layer, thereby forming the tapered sidewalls;
removing said absorbing layer and said photoresist layer;
and depositing a conformal overcoat onto said etch-stop layer and said dielectric oxide layer to form the metallic overcoat.

18. An apparatus, comprising: a substrate; an etch-stop layer fixedly attached to said substrate; a dielectric oxide layer fixedly attached to said etch-stop layer, wherein said dielectric oxide layer comprises a grating pattern including grating lines, wherein sidewalls of said grating lines taper together toward an upper surface of said dielectric oxide layer, and wherein said tapered sidewalls have a non-zero curvature; and a metallic overcoat fixedly attached to said etch-stop layer and said dielectric oxide layer, wherein the metallic overcoat fills spaces between adjacent grating lines and forms grating ridges above the grating lines, and wherein the apparatus does not include a photoresist.

19. The apparatus of claim 18, wherein said substrate is polished.

20. The apparatus of claim 18, wherein said etch-stop layer is etch-resistant in a reactive ion beam etcher, but soluble in wet chemical solution for liftoff from said substrate.

21. The apparatus of claim 18, wherein said etch-stop layer comprises a material selected from the group consisting of non-oxide material, metal, a nitride material and chrome.

22. The apparatus of claim 21, wherein said material comprises boron nitride.

23. The apparatus of claim 18, wherein said dielectric oxide layer comprises a predetermined thickness that has been optimized to operate at a desired diffraction efficiency when etched into a grating profile.

24. The apparatus of claim 18, wherein said dielectric oxide layer comprises material selected from the group consisting of $Ta_2O_5$, $ZrO_2$, $HfO_2$, $SnO_2$, $InO_2$, $ZnO$, $Al_2O_3$ (aluminum oxide) $Y_2O_3$ (yttrium oxide) and $Sc_2O_3$ (scandium oxide).

25. The apparatus of claim 18, wherein said dielectric oxide layer comprises an amorphous dielectric oxide.

26. The apparatus of claim 18, further comprising an adhesion layer between and in direct contact with said dielectric oxide layer and said metallic overcoat.

27. The apparatus of claim 26, wherein said adhesion layer comprises chrome.

28. The apparatus of claim 18, wherein said metallic overcoat comprises a metal selected from the group consisting of gold, silver and aluminum.

\* \* \* \* \*